(12) United States Patent
Johnson (10) Patent No.: US 10,208,464 B1
(45) Date of Patent: Feb. 19, 2019

(54) PORTABLE GROOMING DEVICE AND ASSOCIATED USE THEREOF

(71) Applicant: Vernon Johnson, Bronx, NY (US)

(72) Inventor: Vernon Johnson, Bronx, NY (US)

( * ) Notice: Subject to any disclaimer, the term of this patent is extended or adjusted under 35 U.S.C. 154(b) by 0 days.

(21) Appl. No.: 15/482,800

(22) Filed: Apr. 9, 2017

(51) Int. Cl.
| | | |
|---|---|---|
| *E03C 1/04* | (2006.01) |
| *B05B 1/20* | (2006.01) |
| *B05B 1/30* | (2006.01) |
| *E03C 1/02* | (2006.01) |
| *A45D 24/22* | (2006.01) |
| *A45D 19/02* | (2006.01) |

(52) U.S. Cl.
CPC ............ *E03C 1/0409* (2013.01); *A45D 19/02* (2013.01); *A45D 24/22* (2013.01); *B05B 1/205* (2013.01); *B05B 1/3026* (2013.01); *E03C 1/025* (2013.01); *E03C 2001/026* (2013.01)

(58) Field of Classification Search
CPC ..................................................... A47K 7/024
USPC ..................................................... 4/605–611
See application file for complete search history.

(56) References Cited

U.S. PATENT DOCUMENTS

| | | | | |
|---|---|---|---|---|
| 3,749,064 A * | 7/1973 | Weinstein | ............ | A01K 13/001 119/664 |
| 4,485,583 A * | 12/1984 | Planty | .................. | A01K 13/002 15/327.1 |
| 4,513,466 A * | 4/1985 | Keddie | .................. | A46B 13/06 15/29 |
| 4,704,759 A * | 11/1987 | Mesa | ..................... | A47K 7/024 15/110 |
| 4,998,836 A * | 3/1991 | Scripnick | .................. | B05B 7/30 137/878 |
| D318,179 S * | 7/1991 | Akins | ..................... | A47K 7/024 D23/223 |
| 5,153,962 A * | 10/1992 | Ritter | ..................... | A46B 13/06 15/28 |
| D369,026 S * | 4/1996 | Furbert | ................... | A47K 7/024 D23/223 |
| 5,649,502 A * | 7/1997 | Frank | ................... | A01K 13/001 119/665 |
| D438,708 S * | 3/2001 | Weiner | .................. | A47K 7/024 D4/115 |
| 6,439,790 B1 * | 8/2002 | Kay | ................... | A46B 11/0013 401/149 |
| D484,314 S * | 12/2003 | DiGioia | ............ | A46B 11/0013 D4/115 |
| D485,990 S * | 2/2004 | Wallace | ............. | A46B 11/0013 D4/115 |
| 7,478,957 B1 * | 1/2009 | Thornton | ............... | A45D 34/00 15/160 |
| 8,006,647 B2 * | 8/2011 | Raber | .................. | A01K 13/002 119/603 |

(Continued)

*Primary Examiner* — Lori Baker (57) ABSTRACT

A portable grooming device is detachably coupled to a shower, sink, or bathtub and includes a shower head style, flow-through hair-comb and flexible hose, through which water will travel, making the act of washing, conditioning, and combing one's hair, easier, more enjoyable, more effective, and more convenient. The portable grooming device includes a flexible hose configured to be detachably coupled to an existing water-supply source, and a comb in fluid communication with the flexible hose wherein the comb is detachably mated to the hose. Advantageously, the comb is configured to discharge fluid outwardly and away therefrom.

11 Claims, 4 Drawing Sheets

(56) References Cited

U.S. PATENT DOCUMENTS

| | | | |
|---|---|---|---|
| 8,360,668 B1* | 1/2013 | Hinnant | A46B 5/0075 |
| | | | 401/188 R |
| 9,393,174 B1* | 7/2016 | Pope | A61H 7/005 |
| 2009/0113616 A1* | 5/2009 | Daly, Sr. | A46B 11/0058 |
| | | | 4/606 |
| 2010/0083438 A1* | 4/2010 | Kao | A46B 11/063 |
| | | | 4/606 |
| 2018/0110201 A1* | 4/2018 | Mohyer, Jr. | A01K 13/001 |

* cited by examiner

PORTABLE GROOMING DEVICE AND ASSOCIATED USE THEREOF

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to a personal grooming implements and, more particularly, to a portable grooming device detachably coupled to a shower, sink, or bathtub and includes a shower head style, flow-through hair-comb and flexible hose, through which water will travel, making the act of washing, conditioning, and combing one's hair, easier, more enjoyable, more effective, and more convenient.

Prior Art

Millions of Americans step into a shower to wash themselves every day—and that each of these persons uses soap and shampoo, and most also use hair-conditioner. In the course of the shower, then, we must handle a shampoo container, and a container of conditioner, as we massage these agents into our hair, scrub, and then rinse them out. The invention to be introduced, described, and discussed in the course of this report—a simple, easily affordable accessory for shower, bath, or even sink—would make shampooing and conditioning far easier, more convenient, and effective, and thus meet the needs of millions of consumers around the world.

Accordingly, a need remains for a portable grooming device in order to overcome at least one aforementioned shortcoming. The exemplary embodiment(s) satisfy such a need by providing a portable grooming device detachably coupled to a shower, sink, or bathtub and includes a shower head style, flow-through hair-comb and flexible hose, through which water will travel, and that is convenient and easy to use, lightweight yet durable in design, versatile in its applications, and designed for making the act of washing, conditioning, and combing one's hair, easier, more enjoyable, more effective, and more convenient.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a portable grooming device detachably coupled to a shower, sink, or bathtub and includes a shower head style, flow-through hair-comb and flexible hose, through which water will travel, making the act of washing, conditioning, and combing one's hair, easier, more enjoyable, more effective, and more convenient. These and other objects, features, and advantages of the non-limiting exemplary embodiment(s) are provided by a portable grooming device including a flexible hose configured to be detachably coupled to an existing water-supply source, and a comb in fluid communication with the flexible hose wherein the comb is detachably mated to the hose. Advantageously, the comb is configured to discharge fluid outwardly and away therefrom.

In a non-limiting exemplary embodiment, the hose includes a proximal end having a first coupling affixed thereto, and a distal end. Notably, the first coupling is configured to detachably mate to the existing water-supply source. Also, the is configured to detachably mate to the comb.

In a non-limiting exemplary embodiment, another coupling may be attached to the distal end for providing a more secure connection between the hose and the comb.

In a non-limiting exemplary embodiment, the comb includes a shaft including a proximal end having a third coupling directly mated to the distal end (such as a frictional fit configuration). Such a shaft further has a centrally registered longitudinal axis and an axial bore aligned parallel thereto. Advantageously, the axial bore is in selective fluid communication with the hose. The comb further has a plurality of tines monolithically integral to the shaft and protruding laterally away therefrom. Notably, a plurality of discharge nozzles are intermediately situated between the tines fluidly communicated with the axial bore.

In a non-limiting exemplary embodiment, the discharge nozzles are intercalated between the tines. Such discharge nozzles are juxtaposed along a rectilinear pattern and registered parallel to the centrally registered longitudinal axis.

In a non-limiting exemplary embodiment, the tines are coextensively shaped. Similarly, the discharge nozzles are coextensively shaped. In this manner, the discharge nozzles and the tines are oriented perpendicular to the axial bore and protrude laterally away from the axial bore.

In a non-limiting exemplary embodiment, the hose further includes a water-regulating mechanism including a valve intermediately located between the proximal end and the distal end of the hose.

In a non-limiting exemplary embodiment, the comb further includes a deformably resilient portion in communication with the shaft such that the deformably resilient portion is located downstream of the third coupling and upstream of the discharge nozzles. Advantageously, the axial bore extends from the proximal end of the shaft to a distal end of the shaft. In this manner, a width of the axial bore, located at the deformably resilient portion of the shaft, is caused to automatically expand and restrict between an untensioned equilibrium position and a tension compressed position, respectively, when an external force constricts and releases the deformably resilient portion, respectively.

In a non-limiting exemplary embodiment, each of the tines is resiliently flexible and displaced between an equilibrium rectilinear position and a tensioned curvilinear position. Advantageously, corresponding ones of the discharge nozzles are caused to automatically open and close when associated pairs of the tines are displaced between the equilibrium rectilinear position and the tensioned curvilinear position.

The present disclosure further includes a method of utilizing a portable grooming device for effectively washing, conditioning, and combing user hair. Such a method includes the steps of: providing a flexible hose; providing and detachably mating a comb to the hose such that the comb is in fluid communication with the flexible hose;

detachably coupling the hose to an existing water-supply source; turning on the existing water-supply source; positioning and displacing the comb along the user hair; and the comb discharging fluid outwardly and away therefrom, onto the user hair.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 7 is another front elevational view showing the tines at tensioned curvilinear positions, wherein associated discharge nozzles are toggled to a closed position;

FIG. 7a is a cross-sectional view of the tines taken along line 7a-7a in FIG. 7; and FIG. 7b is an enlarged view of section 7b taken in FIG. 7a.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

Figures 1, 1A, 1B:
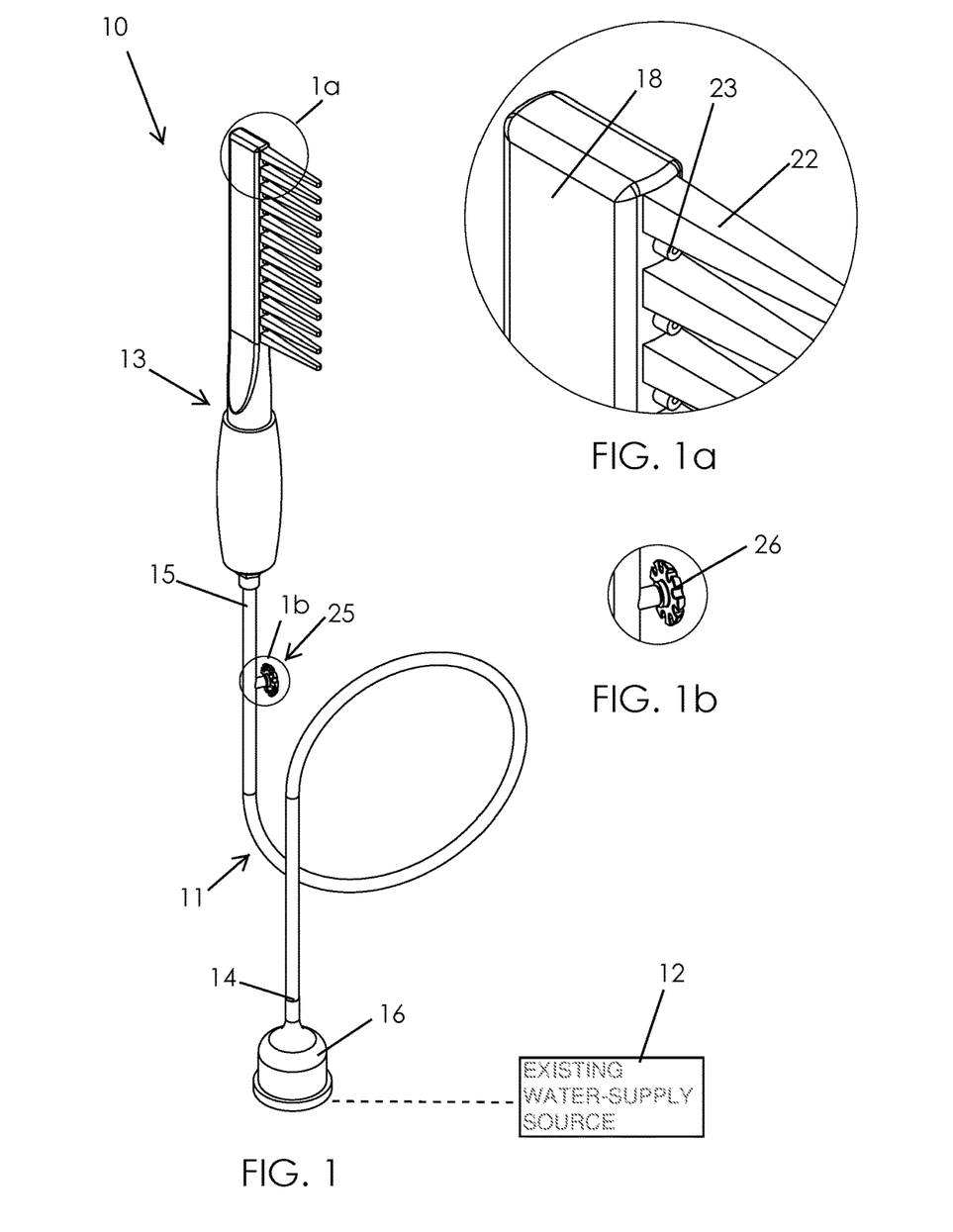
FIG. 1 is a perspective view of a portable grooming device, in accordance with a non-limiting exemplary embodiment.
FIG. 1a is an enlarged view of section 1a taken in FIG. 1.
FIG. 1b is an enlarged view of section 1b taken in FIG. 1.
Figure 2:
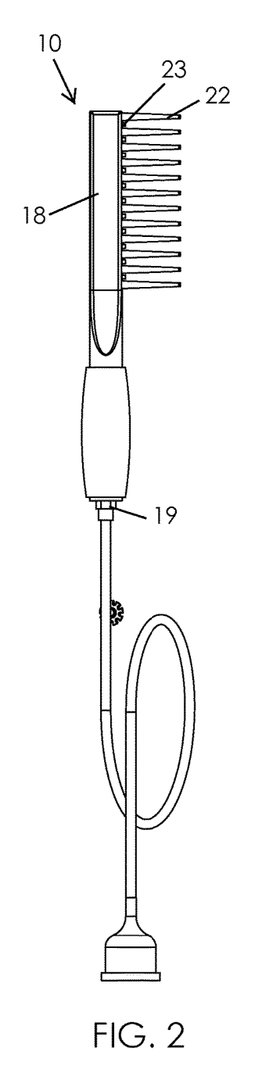
FIG. 2 is a side elevational view of the portable grooming device shown in FIG. 1.
Figure 3:
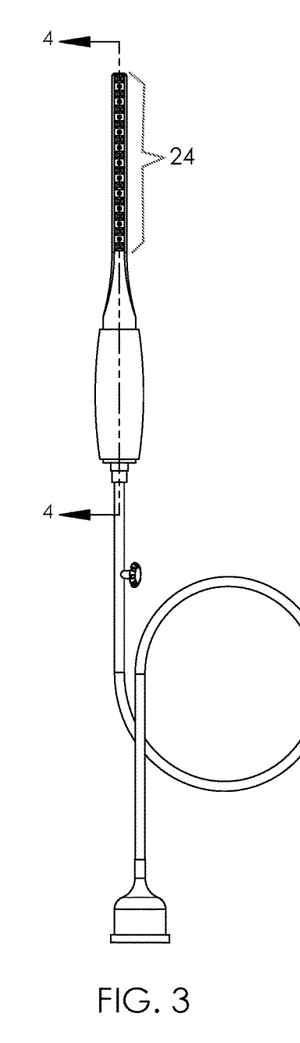
FIG. 3 is a front elevational view of the portable grooming device shown in FIG. 1.
Figure 4:
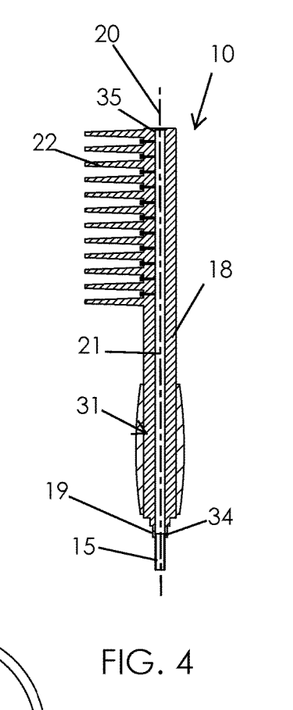
FIG. 4 is a cross-sectional view of the comb taken along line 4-4 in FIG. 3.
Figure 5:
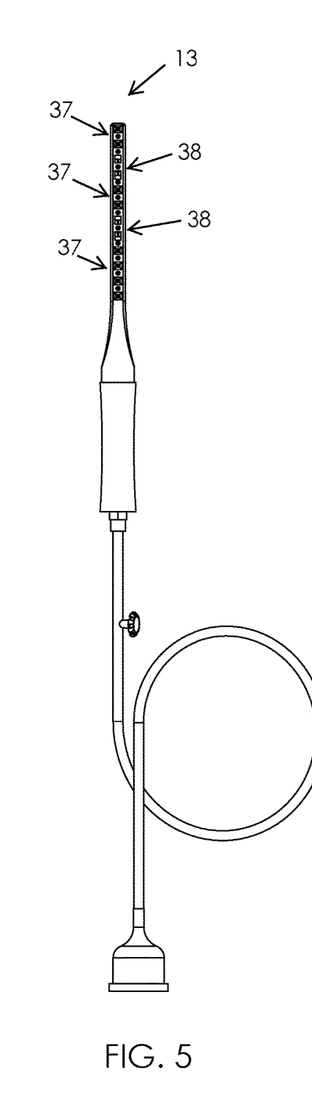
FIG. 5 is a front elevational view showing the tines at tensioned curvilinear positions, wherein associated discharge nozzles are toggled to a closed position.
Figure 6:
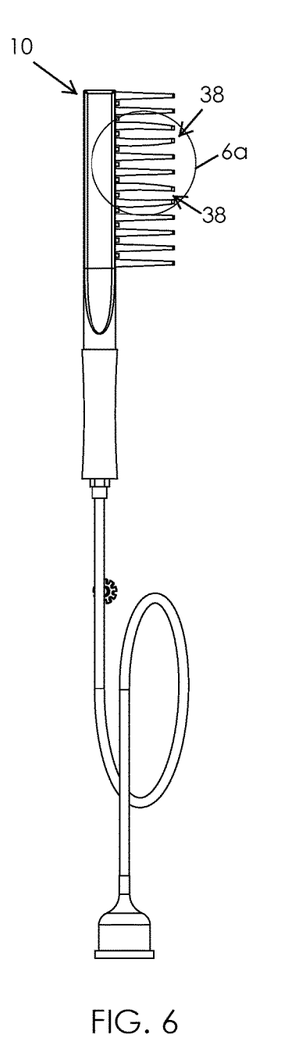
FIG. 6 is a side elevational view of the portable grooming device shown in FIG. 5.
Figure 6A:
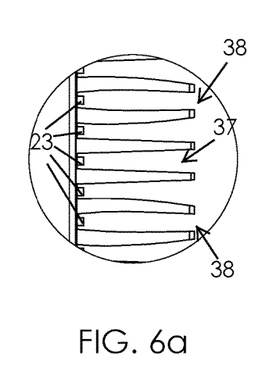
FIG. 6a is an enlarged view of the tensioned curvilinear position of the tines shown in FIGS. 5 and 6.
Figures 7, 7A, 7B:
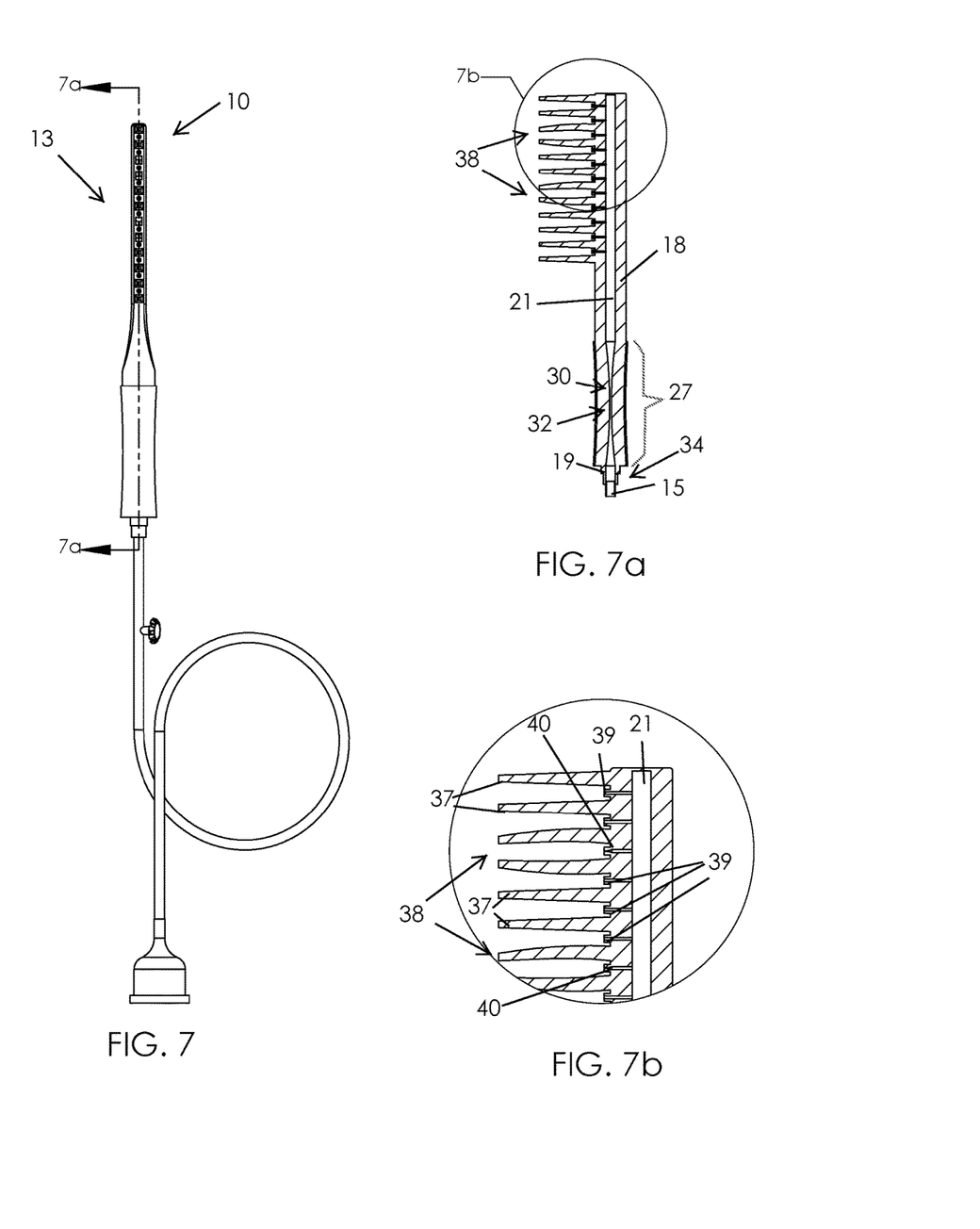

The non-limiting exemplary embodiment(s) is/are referred to generally in FIGS. 1-7b and is/are intended to provide a portable grooming device 10 including a flexible hose 11 configured to be detachably coupled to an existing water-supply source 12, and a comb 13 in fluid communication with the flexible hose 11 wherein the comb 13 is detachably mated to the hose 11. Advantageously, the comb 13 is configured to discharge fluid outwardly and away therefrom.

In a non-limiting exemplary embodiment, the hose 11 includes a proximal end 14 having a first coupling 16 affixed thereto, and a distal end 15. Notably, the first coupling 16 is configured to detachably mate to the existing water-supply source 12. Also, the distal end 15 is configured to detachably mate to the comb 13 (via a frictional fit, for example).

In a non-limiting exemplary embodiment, another coupling (not shown) may be attached to the distal end 15 for providing a more secure connection between the hose 11 and the comb 13.

In a non-limiting exemplary embodiment, the comb 13 includes a shaft 18 including a proximal end 34 having a third coupling 19 directly mated to the distal end 15 (via a frictional fit, for example). Such a shaft 18 further has a centrally registered longitudinal axis 20 and an axial bore 21 aligned parallel thereto. Advantageously, the axial bore 21 is in selective fluid communication with the hose 11. The comb 13 further has a plurality of tines 22 monolithically integral to the shaft 18 and protruding laterally away therefrom. Notably, a plurality of discharge nozzles 23 are intermediately situated between the tines 22 fluidly communicated with the axial bore 21.

In a non-limiting exemplary embodiment, the discharge nozzles 23 are intercalated between the tines 22. Such discharge nozzles 23 are juxtaposed along a rectilinear pattern 24 and registered parallel to the centrally registered longitudinal axis 20.

In a non-limiting exemplary embodiment, the tines 22 are coextensively shaped. Similarly, the discharge nozzles 23 are coextensively shaped. In this manner, the discharge nozzles 23 and the tines 22 are oriented perpendicular to the axial bore 21 and protrude laterally away from the axial bore 21.

In a non-limiting exemplary embodiment, the hose 11 further includes a water-regulating mechanism 25 including a valve 26 intermediately located between the proximal end 14 and the distal end 15 of the hose 11.

In a non-limiting exemplary embodiment, the comb 13 further includes a deformably resilient portion 27 in communication with the shaft 18 such that the deformably resilient portion 27 is located downstream of the third coupling 19 and upstream of the discharge nozzles 23. Advantageously, the axial bore 21 extends from the proximal end 34 of the shaft 18 to a distal end 35 of the shaft 18. In this manner, a width 30 of the axial bore 21, located at the deformably resilient portion 27 of the shaft 18, is caused to automatically expand and restrict between an untensioned equilibrium position 31 and a tension compressed position 32, respectively, when an external force constricts and releases the deformably resilient portion 27, respectively.

In a non-limiting exemplary embodiment, each of the tines 22 is resiliently flexible and displaced between an equilibrium rectilinear position 37 and a tensioned curvilinear position 38. Advantageously, corresponding ones of the discharge nozzles 23 are caused to automatically open (open position 39) and close (closed position 40) when associated pairs of the tines 22 are displaced between the equilibrium rectilinear position 37 and the tensioned curvilinear position 38.

The present disclosure further includes a method of utilizing a portable grooming device 10 for effectively washing, conditioning, and combing user hair. Such a method includes the steps of: providing a flexible hose 11; providing and detachably mating a comb 13 to the hose 11 such that the comb 13 is in fluid communication with the flexible hose 11; detachably coupling the hose 11 to an existing water-supply source 12; turning on the existing water-supply source 12; positioning and displacing the comb 13 along the user hair; and the comb 13 discharging fluid outwardly and away therefrom, onto the user hair.

In a non-limiting exemplary embodiment, the portable grooming device 10 includes a flexible, four-foot rubber hose 11 with a universal attachment 16 at one end—suitable for temporary or long-term mounting over a shower pipe, a bathtub spout, or a sink faucet—and a unique, flow-through comb 13 head at removably attached at the distal end 15. The portable grooming device 10 may be fabricated in synthetic or vulcanized rubber (for the hose 11 and pipe-mount).

The portable grooming device 10 features the aforementioned four-foot flexible rubber hose 11 and pipe, spout, or tap-mounting flange. The comb 13 may be approximately 12 inches in length, 5½ inches of which will be equipped with approximately 9 to 12 teeth or tines 22. Water will flow through the shaft 18 of the comb 13 and out through discharge nozzles 23 situated between the tines 22 along the shaft 18.

The portable grooming device 10 present consumers with a shower/bath accessory of uncommon utility and convenience. Equally useful for applying and working in both shampoo and hair-conditioner, the portable grooming device 10 permits the bather to not only clean and condition but also untangle their hair in the process, likely leading to a superior level of cleaning and conditioning from the roots of the hair right down to the ends. Easy to install without tools, the portable grooming device 10 may be mounted to a shower pipe, a bathtub spout, or a sink tap—making it ideal not only for adults who take showers, but also for children who prefer baths, and even for infants who are bathed in bassinets at a sink—or for a quick conditioning rinse by an adult in a hurry. Especially ideal for combing conditioner through one's hair in the most effective application, the portable grooming device 10 is versatile, easy to use, convenient, and eminently affordable—all of which suggests that the portable grooming device 10, clever in conception and thoughtful in design, and conceived to meet a real need shared by millions of consumers, should find a wide and enthusiastic market reception, both within America and around the world.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A portable grooming device for effectively washing, conditioning, and combing user hair, said portable grooming device comprising:
   a hose configured to be detachably coupled to an existing water-supply source; and
   a comb in fluid communication with said flexible hose, said comb being configured to discharge fluid outwardly and away therefrom;
   wherein said hose comprises
      a proximal end having a first coupling affixed thereto, and
      a distal end;
      wherein said first coupling is configured to detachably mate to the existing water-supply source;
      wherein said distal end is configured to detachably mate to said comb;
   wherein said comb comprises
      a shaft including a proximal end having a third coupling directly mated to said distal end, said shaft further having a centrally registered longitudinal axis and an axial bore aligned parallel thereto, said axial bore being in selective fluid communication with said hose,
      a plurality of tines being monolithically integral to said shaft and protruding laterally away therefrom, and
      a plurality of discharge nozzles intermediately situated between said tines, said discharge nozzles being in fluid communication with said axial bore;
   wherein said comb further comprises a deformably resilient portion in communication with said shaft such that said deformably resilient portion is located downstream of said third coupling and upstream of said discharge nozzles, wherein said axial bore extends from said proximal end of said shaft to a distal end of said shaft;
   wherein a width of said axial bore, located at said deformably resilient portion of said shaft, is caused to automatically expand and restrict between an untensioned equilibrium position and a tension compressed position, respectively, when an external force constricts and releases said deformably resilient portion, respectively.

2. The portable grooming device of claim 1, wherein said discharge nozzles are intercalated between said tines, said discharge nozzles being juxtaposed along a rectilinear pattern and registered parallel to the centrally registered longitudinal axis.

3. The portable grooming device of claim 1, wherein said tines are coextensively shaped, wherein said discharge nozzles are coextensively shaped, wherein said discharge nozzles and said tines are oriented perpendicular to said axial bore and protrude laterally away from said axial bore.

4. The portable grooming device of claim 1, wherein said hose further comprises: a water-regulating mechanism including a valve intermediately located between said proximal end and said distal end of said hose.

5. The portable grooming device of claim 1, wherein each of said tines is resiliently flexible and displaced between an equilibrium rectilinear position and a tensioned curvilinear position;
   wherein corresponding ones of said discharge nozzles are caused to automatically toggle between an open position and a closed position when associated pairs of said tines are displaced between said equilibrium rectilinear position and said tensioned curvilinear position.

6. A portable grooming device for effectively washing, conditioning, and combing user hair, said portable grooming device comprising:
   a flexible hose configured to be detachably coupled to an existing water-supply source; and
   a comb in fluid communication with said flexible hose, said comb being configured to discharge fluid outwardly and away therefrom;
   wherein said comb is detachably mated to said hose;
   wherein said hose comprises
      a proximal end having a first coupling affixed thereto, and
      a distal end;
      wherein said first coupling is configured to detachably mate to the existing water-supply source;
      wherein said distal end is configured to detachably mate to said comb;
   wherein said comb comprises
      a shaft including a proximal end having a third coupling directly mated to said distal end, said shaft further having a centrally registered longitudinal axis and an axial bore aligned parallel thereto, said axial bore being in selective fluid communication with said hose,
      a plurality of tines being monolithically integral to said shaft and protruding laterally away therefrom, and
      a plurality of discharge nozzles intermediately situated between said tines, said discharge nozzles being in fluid communication with said axial bore;
   wherein each of said tines is resiliently flexible and displaced between an equilibrium rectilinear position and a tensioned curvilinear position;
   wherein corresponding ones of said discharge nozzles are caused to automatically toggle between an open position and a closed position when associated pairs of said tines are displaced between said equilibrium rectilinear position and said tensioned curvilinear position.

7. The portable grooming device of claim 6, wherein said discharge nozzles are intercalated between said tines, said discharge nozzles being juxtaposed along a rectilinear pattern and registered parallel to the centrally registered longitudinal axis.

8. The portable grooming device of claim 6, wherein said tines are coextensively shaped, wherein said discharge nozzles are coextensively shaped, wherein said discharge nozzles and said tines are oriented perpendicular to said axial bore and protrude laterally away from said axial bore.

9. The portable grooming device of claim 6, wherein said hose further comprises: a water-regulating mechanism including a valve intermediately located between said proximal end and said distal end of said hose.

10. The portable grooming device of claim 6, wherein said comb further comprises: a deformably resilient portion in communication with said shaft such that said deformably resilient portion is located downstream of said third coupling and upstream of said discharge nozzles, wherein said axial bore extends from said proximal end of said shaft to a distal end of said shaft;

wherein a width of said axial bore, located at said deformably resilient portion of said shaft, is caused to automatically expand and restrict between an untensioned equilibrium position and a tension compressed position, respectively, when an external force constricts and releases said deformably resilient portion, respectively.

11. A method of utilizing a portable grooming device for effectively washing, conditioning, and combing user hair, said method comprising the steps of:

providing a flexible hose;

providing and detachably mating a comb to said hose such that said comb is in fluid communication with said flexible hose;

detachably coupling said hose to an existing water-supply source;

turning on the existing water-supply source;

positioning and displacing said comb along the user hair; and said comb discharging fluid outwardly and away therefrom, onto the user hair;

wherein said hose comprises a proximal end having a first coupling affixed thereto, and         a distal end;

wherein said first coupling is configured to detachably mate to the existing water-supply source;

wherein said distal end is configured to detachably mate to said comb;

wherein said comb comprises a shaft including a proximal end having a third coupling directly mated to said distal end, said shaft further having a centrally registered longitudinal axis and an axial bore aligned parallel thereto, said axial bore being in selective fluid communication with said hose,         a plurality of tines being monolithically integral to said shaft and protruding laterally away therefrom, and         a plurality of discharge nozzles intermediately situated between said tines, said discharge nozzles being in fluid communication with said axial bore;

wherein each of said tines is resiliently flexible and displaced between an equilibrium rectilinear position and a tensioned curvilinear position;

wherein corresponding ones of said discharge nozzles are caused to automatically toggle between an open position and a closed position when associated pairs of said tines are displaced between said equilibrium rectilinear position and said tensioned curvilinear position.

\* \* \* \* \*